UNITED STATES PATENT OFFICE.

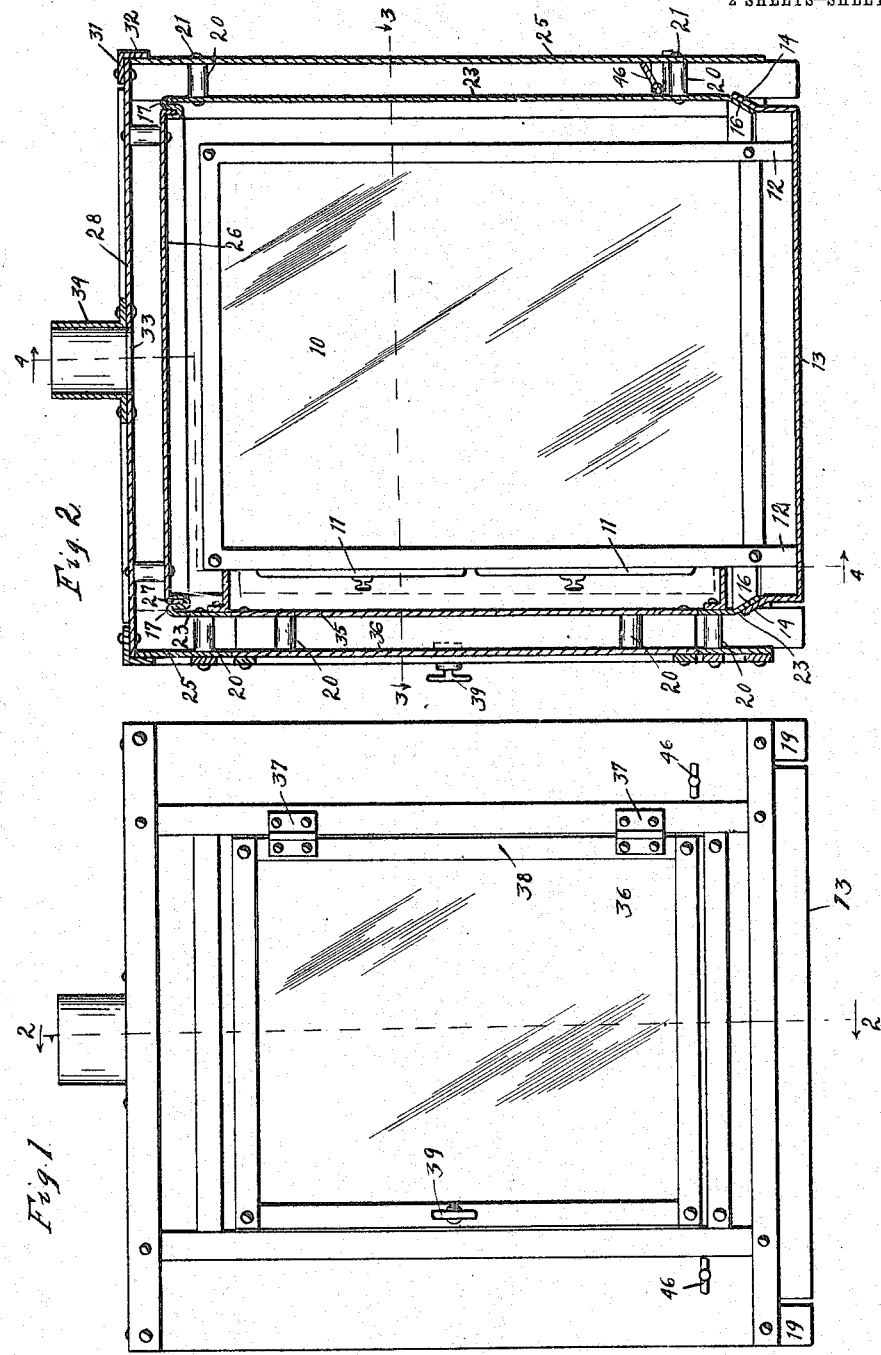

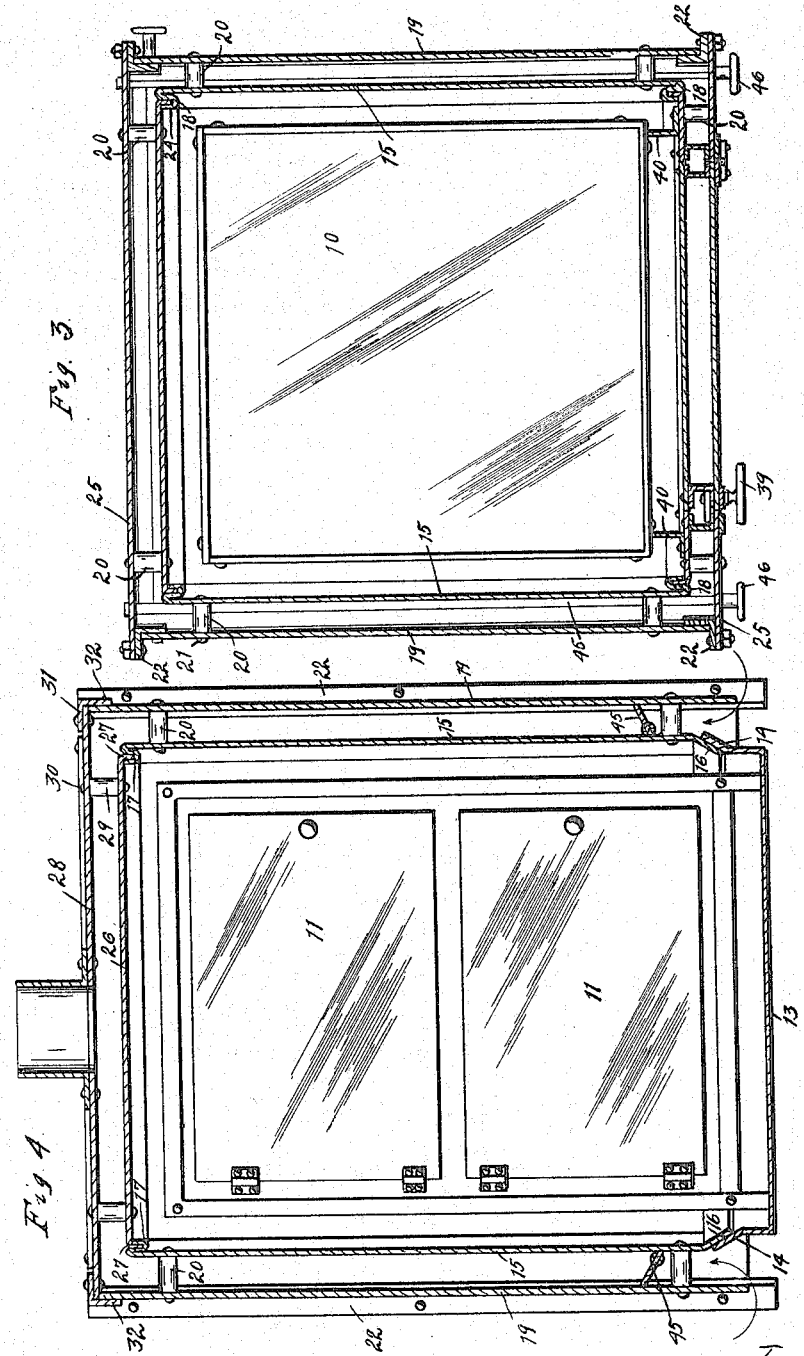

JOHN BECHTEL, OF EARLHAM, IOWA.

HEAT-RETAINER FOR BAKERS' OVENS.

1,128,933.  Specification of Letters Patent.  Patented Feb. 16, 1915.

Application filed June 4, 1914. Serial No. 843,098.

*To all whom it may concern:*

Be it known that I, JOHN BECHTEL, a citizen of the United States, and resident of Earlham, in the county of Madison and State of Iowa, have invented a certain new and useful Heat-Retainer for Bakers' Ovens, of which the following is a specification.

The object of my invention is to provide a heat retainer for bakers' ovens, so arranged and constructed that it may be readily and easily put together or taken apart for repairs, or for transporting the parts and the oven from place to place, or for storage.

Still a further object is to provide such a device, so constructed and arranged as to provide a dead air space around the oven and an air space around said dead air space adapted to be in communication with a pipe leading to a point outside the room in which the oven is placed.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a front elevation of a heat retainer for bakers' ovens, embodying my invention. Fig. 2 shows a vertical, transverse, sectional view, taken on the line 2—2 of Fig. 1. Fig. 3 shows a horizontal, sectional view, taken on the line 3—3 of Fig. 2, and Fig. 4 shows a vertical, sectional view, taken on the line 4—4 of Fig. 2.

In the accompanying drawings I have used the reference numeral 10 to indicate generally a portable oven having the doors 11 and the short downwardly extending legs 12, for supporting the bottom of the oven above a floor or the like. The oven is preferably inclosed in a suitable collapsible casing, which I shall now describe.

The legs 12 rest in a pan 13, made of sheet iron or other suitable material and having at its upper edge an upwardly and forwardly folding portion 14. Spaced from the sides of the oven 10 are the side members 15 of the collapsible casing, having at their lower edges inwardly and downwardly inclined portions 16, adapted to be received in and to engage the portions 14, as shown in Figs. 2 and 4. At their upper edges, the wall members 15 are provided with downwardly opening grooves 17, as shown in Fig. 4. The members 15 are also provided at their side edges with outwardly opening grooves 18, similar to the grooves 17.

It will be seen that a dead air space is formed between the members 15 and the oven 10. Mounted on the side walls 15 are the outer side walls 19. The walls 19 are spaced from the walls 15 by spacing devices 20, which are preferably short pieces of pipe and are secured to said walls 15 by means of bolts 21 extended through the walls 19, the pipe sections 20 and the walls 15, as shown in Figs. 3 and 4. Secured to the outer side edges of the walls 19 are angle bars 22. The lower edges of the walls 19 do not extend to the level of the bottom of the pan 13 but the walls 19 are supported by the angle bars 22 which extend below the lower edges of said walls, all as shown in Fig. 4. At the back and front of the device are walls 23, similar in construction to the walls 15, having upwardly opening grooves 17 at their upper ends, and having at their side edges inwardly extending flanges 24 received in the groove 18. Secured to the walls 23 are spaced outer walls 25, spaced from the walls 23 by the devices 20, similar to those already described, and fastened to said walls 23 by means of bolts 21. The side edges of the walls 25 rest against the flanges of the angle bars 22. The members 25 do not extend to the level of the bottom of the pan 13. I provide a detachable cover for said casing, comprising the inner, top member 26, having at its periphery the downwardly extending flange 27 and the outer, upper top member 28 spaced from the member 26 by means of the short pipe sections 29 secured to the member 26 by means of the bolts 30 extending through said parts 26 and 28 and the pipe sections 29.

Mounted on the outer edge of the member 28, at each edge thereof, is an angle bar 31, having a downwardly extending flange 32, which receives and engages the upper edges of the members 19 and 25. In the center of the top member 28 is an opening 33 and secured to the member 28 around the opening 33 is a short pipe 34, designed to be secured to a stove pipe or any other suitable means for carrying heated air away. The central portions of the front walls 23 and 25 are cut away to receive a hinged door comprising the inner member 35 and the outer member 36, held spaced apart by pipe sections 20 and bolts extended therethrough and through the members 35 and 36. The member 36 is hinged to the front member 25 by hinges 37. Around the edge of the door member 36 on the outside thereof, are strips of iron 38, which extend slightly beyond the edges of the door and close the joints between the door section 36 and the front wall member 25. A suitable catch device 39 is provided for locking the door in its closed position. Vertical and horizontal partitions 40 are placed between the oven 10 and the front wall 23 around the door opening to prevent communication between the dead air space around the oven 10 and the door opening. Pivotally mounted between the members 15 and 19 on each side of the heat retaining device, and preferably near the lower end thereof, is a damper 45 having a handle 46 which extends to a point outside the heat retaining device where it is easy of access. A similar damper 46 is mounted between the lower ends of the back members 23 and 25.

It will be understood that my improved baker's oven and heat retainer therefor may be used wherever desired, and on account of the fact that the heat retainer is made in knock-down form the whole thing may be quickly and easily taken apart for transportation or other purposes. With a baker's oven, particularly a baker's oven of the portable type, it is desirable to obtain as much heat in the oven as possible and as far as possible to prevent radiation of the heat into the room. Especially in the summer months such radiation renders the room very uncomfortable.

To accomplish the desirable purposes above mentioned, I have provided a heat retainer so constructed that there is a dead air space between the inner walls of the collapsible casing and the walls of the oven. It will be understood that on account of this construction, most of the heat will be retained in the oven and in the dead air space around it. Some heat, however, will be radiating from the walls 23 and 15. It will be understood that the pipe 34 may be connected with suitable means for conducting heat to a point outside of the room and that the heat that is radiated in the walls 23 and 15 may be carried off from the spaces between said walls and the outer part of the casing through the pipe 34.

The use of the pan 13 furnishes an air space below the oven and prevents burning the floor.

It will readily be seen that a current of air will pass between the two walls of the door so that the outer portions of the door will be kept comparatively cool so that the door will not burn the baker when he opens or closes it.

I realize that some changes may be made in the details of the construction of my oven and heat retainer, and desire to cover by this application any such changes which may be included within the scope of the following claims.

I claim as my invention:

1. In a device of the class described, a baker's oven having short supporting legs, a pan thereunder, a collapsible casing, comprising double side walls, double rear and front walls, detachably mounted on said side walls, a double walled top detachably mounted on said side and end walls, said top being provided with an opening in its upper wall member, the outer members of said double walls extending to points above the lower level of said pan, and a double walled door in the front double wall of said casing.

2. In a device of the class described, an oven having short supporting legs, a pan thereunder having at its upper edge an outwardly flared portion, double side walls spaced from said oven, the inner members of said side walls being provided with outwardly opening grooves and the outer members of said side walls being provided with laterally extending flanges, double end walls, the inner members of which have at their side edges inwardly extending flanges received in said grooves, and the outer members of which engage said laterally extending flanges, all of said inner members of said double walls being inclined downwardly and inwardly at their lower ends and resting upon the inclined portions of said pan, and being also provided at their upper edges with upwardly opening grooves, a double walled top, the lower part of which is provided with a peripheral, downwardly extending flange received in the upwardly opening grooves of the inner wall members, the upper member of which is provided with a downwardly extending flange for receiving and engaging the outer side and end wall members, the upper member of the top being provided with an outlet opening, and a double walled door mounted in the front double wall member.

3. In a device of the class described, a baker's oven having short supporting legs, a pan thereunder, a collapsible casing, comprising double side walls, double rear and front walls, detachably mounted on said side walls, a double walled top detachably mounted on said side and end walls, said top being provided with an opening in its upper wall member, the outer members of said double walls extending to points above the lower level of said pan, a double walled door in the front double wall of said casing, and means for controlling the passage of air through the spaces between said double walls.

4. In a device of the class described, an oven having short supporting legs, a pan thereunder having at its upper edge an outwardly flared portion, double side walls spaced from said oven, the inner members of said side walls being provided with outwardly opening grooves and the outer members of said side walls being provided with laterally extending flanges, double end walls, the inner members of which have at their side edges inwardly extending flanges received in said grooves, and the outer members of which engage said laterally extending flanges, all of said inner members of said double walls being inclined downwardly and inwardly at their lower ends and resting upon the inclined portions of said pan, and being also provided at their upper edges with upwardly opening grooves, a double walled top, the lower part of which is provided with a peripheral, downwardly extending flange received in the upwardly opening grooves of the inner wall members, the upper member of which is provided with a downwardly extending flange for receiving and engaging the outer side and end wall members, the upper member of the top being provided with an outlet opening, a double walled door mounted in the front double wall member, and means for controlling the passage of air through the spaces between said double walls.

Des Moines, Iowa, May 19, 1914.

JOHN BECHTEL.

Witnesses:
C. C. COUCH,
HARRY W. HILL.

Copies of this patent may be obtained for five cents each, by addressing the "Commissioner of Patents, Washington, D. C."